US011253828B2

(12) United States Patent
Schmid

(10) Patent No.: US 11,253,828 B2
(45) Date of Patent: Feb. 22, 2022

(54) ADDITIVE MANUFACTURING DEVICE

(71) Applicant: COOBX AG, Balzers (LI)

(72) Inventor: Marco Schmid, Balzers (LI)

(73) Assignee: COOBX AG

( * ) Notice: Subject to any disclaimer, the term of this patent is extended or adjusted under 35 U.S.C. 154(b) by 574 days.

(21) Appl. No.: 15/781,458

(22) PCT Filed: Dec. 2, 2016

(86) PCT No.: PCT/CH2016/000152
§ 371 (c)(1),
(2) Date: Jun. 4, 2018

(87) PCT Pub. No.: WO2017/091913
PCT Pub. Date: Jun. 8, 2017

(65) Prior Publication Data
US 2020/0247037 A1   Aug. 6, 2020

(30) Foreign Application Priority Data

Dec. 4, 2015   (CH) .................................... 01771/15

(51) Int. Cl.
*B01F 13/08*   (2006.01)
*B29C 64/245*   (2017.01)
(Continued)

(52) U.S. Cl.
CPC ............ *B01F 13/08* (2013.01); *B29C 64/124* (2017.08); *B29C 64/245* (2017.08);
(Continued)

(58) Field of Classification Search
CPC ........................... B29C 64/393; B29C 64/264
See application file for complete search history.

(56) References Cited

U.S. PATENT DOCUMENTS

| 5,174,943 A | 12/1992 | Hull |
| 2007/0075461 A1 | 4/2007 | Hunter et al. |

(Continued)

FOREIGN PATENT DOCUMENTS

| CN | 1057724 | * | 1/1992 | ........... B29C 64/135 |
| CN | 1974185 | * | 6/2007 | ............ B29B 13/02 |

(Continued)

OTHER PUBLICATIONS

Lawton CN 1057724 1992 English Translation (Year: 1992).*
Ben CN 1974185 2007 English Translation (Year: 2007).*
Lin CN104943164 2015 English Translation (Year: 2015).*

*Primary Examiner* — Jacob T Minskey
*Assistant Examiner* — Adrien J Bernard
(74) *Attorney, Agent, or Firm* — Morriss O'Bryant Compagni Cannon, PLLC

(57) ABSTRACT

The invention relates to an additive manufacturing device for the layered production of three-dimensional objects from a polymerizable liquid. The device comprises a trough with a bottom for receiving the liquid, a support platform, on which the object is built up and which is height-adjustable relative to the trough, a structural element having a first and a second side, on which the liquid polymerizes on the first side to form an object layer, and a radiation source which irradiates the second side of the beam-permeable structural element. The structural element is disposed above the upper support platform.

14 Claims, 3 Drawing Sheets

(51) Int. Cl.
*B29C 64/255* (2017.01)
*B29C 64/264* (2017.01)
*B29C 64/295* (2017.01)
*B29C 64/124* (2017.01)
*B29C 64/364* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC .......... *B29C 64/255* (2017.08); *B29C 64/264* (2017.08); *B29C 64/295* (2017.08); *B29C 64/364* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2017/0095977 A1* | 4/2017 | Thresh | ................ | B29C 64/393 |
| 2018/0036941 A1* | 2/2018 | Xu | ........................ | B29C 64/393 |
| 2018/0272602 A1* | 9/2018 | Rudisill | ................ | B33Y 30/00 |

FOREIGN PATENT DOCUMENTS

| | | | | |
|---|---|---|---|---|
| CN | 104943164 | * | 9/2015 | ........... B29C 64/227 |
| EP | 0467100 | | 1/1992 | |
| EP | 0467100 A1 | | 1/1992 | |

\* cited by examiner

ADDITIVE MANUFACTURING DEVICE

CROSS-REFERENCE TO RELATED APPLICATIONS

This application is a national phase entry under 35 U.S.C. § 371 of PCT/CH2016/000152 filed on Dec. 2, 2016, which claims priority to Swiss Patent Application No. 01771/15 filed on Dec. 4, 2015, the entirety of each of which is incorporated by this reference

FIELD OF THE INVENTION

The invention relates to an additive manufacturing device for the layered production of three-dimensional objects from a polymerizable (cross-linkable) liquid according to the preamble of claim 1 and a method for the layered production of three-dimensional objects from a polymerizable liquid according to the preamble of claim 13.

PRIOR ART

The prior art in the field of additive manufacturing devices is presently formed by two devices and the manufacturing methods linked thereto.

In the so-called top-down method, the additive manufacturing device comprises a trough into which a UV-curable resin is dispensed. The object to be built up in layers is built up in a layered manner on the surface level of the resin. In this case, the surface of the resin is irradiated using a UV light source in the form of the layer which is to be built up. The layer thus cures in the desired form on the surface of the resin. The object is built up on a structural platform, wherein the platform is moved away from the surface of the resin until the object is completely built up in a layered manner. The top-down method has the advantage that no wearing parts are present. Because of the surface tension existing at the resin surface, however, the contour accuracy of the objects produced using the top-down method is restricted. Since the surface of the resin cannot represent a defined surface, the surface of each layer is necessarily relatively inaccurate.

To improve the contour accuracy of the objects, the so-called bottom-up method was developed. In this case, the object layers to be built up are not built up on the resin surface but rather on the bottom of a resin trough. Since the object is built up by moving the platform upward away from the bottom of the resin trough, it is sufficient if a small quantity of resin is present in the trough in comparison to the top-down method. The bottom must be covered with resin, so that the resin can flow in between bottom and object at all times, in order to build up a layer. The UV light source is arranged below the bottom, because of which the bottom has to be transmissive for the UV light.

To be able to detach each cured layer from the bottom, the bottom has to be provided with a separating layer. The separating layer represents a defined surface for each cured object layer. The object produced in the bottom-up method thus has a high dimensional accuracy. However, the separating layer is mechanically loaded upon each detachment of a cured layer and is therefore a wearing part, which must be replaced again and again by a new separating layer. A further disadvantage is that only simple resins are usable as the structural material, since resins comprising fillers may not be homogenized in this device and resins having increased viscosities may not be processed.

An additive manufacturing device is disclosed in EP 0 467 100 A1, in which a three-dimensional object in layers between a transparent barrier plate and an object table. The object table is positioned in a reactor filled with the liquid to be cured. The plate is positioned on the surface of the liquid. The plate is subjected to radiation from above, which has the result that the liquid is cured to form a layer having defined outer contours directly at the underside of the plate. The plate is set into vibrations with the aid of a shaking unit, whereby it may be detached from the cured layer of the three-dimensional object. The object table is then lowered by the layer thickness of the next object layer, whereby liquid can flow in between the plate and the uppermost cured layer. The next layer is then cured until the three-dimensional object is finished. The device enables the cured object layers to be able to be detached carefully from the plate. Detail-accurate and exact objects are thus producible. However, changing different liquids curable under radiation proves to be very complex if possible at all.

Advantages of the Invention

An advantage of the present invention results from the disadvantages of the described prior art, of refining an additive manufacturing device of the type in question, which does not have the above-described disadvantages. A further advantage is to propose an additive manufacturing device which can process a large number of different functional materials as materials and/or construction materials and to provide the possibility of being able to change rapidly between the different materials.

SUMMARY OF THE INVENTION

The advantages are achieved in an additive manufacturing device for the layered production of three-dimensional objects from a polymerizable liquid in that the manufacturing device comprises at least two troughs filled with different liquids, wherein the trough which is filled with a first liquid is exchangeable with a further trough which is filled with a second liquid. The trough may be exchanged rapidly and cleanly for another trough having another liquid, since only the liquid is located in the trough. The liquid exchange therefore can take place not by cumbersome emptying, cleaning, and refilling of the trough or the container, but rather by simple exchange of two containers. The returned container or the troughs are closable and are therefore storable as needed. A broad product palette of polymerizable liquids with or without fillers can thus be retrievable. Each container can be provided with a separate agitator, so that the removal and the cleaning of the agitator is dispensed with. Due to the possibility of changing the position of the trough in relation to the structural element, the device is extremely flexible and can be adapted to greatly varying polymerizable or cross-linkable liquids and greatly varying three-dimensional objects to be produced. The structural element may be arranged during the printing process above the trough or the liquid, on the liquid level, or in the liquid.

In one embodiment of the invention, the carrier platform and the structural element are held on a common support, which support is extendable into and retractable from the trough. By raising the support, all fittings are removed from the trough simultaneously. The trough can be removed easily from its holder together with the polymerizable liquid located therein. The individual time-consuming removal of fittings from the trough can be dispensed with. A further trough having another liquid may be placed just as easily into the holder provided for this purpose. The support solely has to be extended into the trough to start the additive construction of an object. The extension of the support also has the advantage that the liquid is thus mixed and additional homogenization of the liquid does not necessarily have to be provided.

In a further embodiment of the invention, the carrier platform is held so it is displaceable at least in the vertical direction on the support, whereby the distance between the carrier platform and the structural platform is changeable. The support therefore also includes the linear movement device which is necessary for building up an object in layers. The support forms a unit with the carrier platform and the structural element, which is extendable into and retractable from the trough using a single vertical movement.

It has proven to be advantageous if the radiation source is held so it is displaceable at least in the vertical direction on the support. The displaceability of the radiation source in relation to the structural element has the result that the resolution of the image which is used as the template for forming an object layer may be set and adapted rapidly.

The invention is distinguished in that a temperature-controllable homogenization unit for homogenizing and for setting the temperature of the polymerizable liquid is arranged on the underside of the bottom. The processing parameters of the liquid may therefore be adapted individually to the liquid properties. In particular, the viscosity of the liquid may be set to a value at which it may be polymerize particularly well to form layers. Liquids comprising fillers and/or having high viscosities can also be processed, since the fillers may be distributed uniformly in the liquid by the homogenizer. Functional materials may also be processed, which are processable only with difficulty or not at all in devices of the prior art. It is thus conceivable to also process liquids which have ceramic, metallic, or mineral fillers.

It has proven to be advantageous if the homogenization unit is a magnetic stirrer. Magnetic stirrers are among the widespread products in laboratory equipment and are accordingly cost-effective and mature. The magnetic stirrer comprises a plate which can be heated or cooled and a so-called agitator. The agitator is laid in the liquid and is rotated by magnetic force. The trough is placed on the plate and can be removed at any time for a product change. An ultrasound action on the liquid, directly mechanically moved stirrers, or a movement of the container are also conceivable as the homogenizer.

The invention is distinguished in that the trough is vertically displaceable. Three production modes can thus be implemented. On the one hand, the structural element can be arranged above the liquid level by the position of the trough. The layer buildup then takes place outside the liquid. On the other hand, the trough can also be positioned such that the structural element comes to rest on the liquid level. The layer buildup then takes place within the liquid. The trough can also be positioned such that the structural element comes to rest within the liquid. The production mode can therefore be adapted to the greatly varying properties of the polymerizable liquid. The trough is also particularly easy to remove from the device due to its displaceability.

The structural element can advantageously be arranged outside or inside the trough. These arrangements are most advantageously achieved by the vertical displaceability of the trough. It would also be conceivable that the structural element is vertically displaceable. The above-described production modes may thus be implemented.

In a further embodiment, the structural element comprises a separating membrane. The separating membrane is preferably constructed from an anti-adhesive material, from which the cured polymerized object layers may be detached easily.

It is particularly desirable if the separating membrane consists of perfluoroethylene propylene (FEP), since this material has an anti-adhesive effect in the case of many UV-curable resins.

The separating membrane is advantageously gas-permeable, to provide inhibiting materials on the first side of the structural element. Such inhibiting materials enable the targeted polymerization of the liquid when they escape therefrom.

It has proven to be advantageous if the structural element comprises a carrier plate. The carrier plate is used to stabilize the structural element, so that it can be arranged separately and intrinsically-stable in the device. The separating membrane can be stretched on the carrier plate. The carrier plate may be made of a transparent material, for example, a glass or a plastic.

The anti-adhesive coating can advantageously be implemented as a thin-film coating. A large number of materials having good anti-adhesive properties are known from thin-film technology.

In a further embodiment, the structural element can be set into vibrations. The vibration has the result that the polymerized object layers may be detached more easily from the structural element. The vibration is also useful if gas bubbles adhering to the structural element are to be detached.

It has proven to be advantageous if the angle of attack of the structural element in relation to the trough is adjustable. If the object is moved to the first side of the structural element, it is thus advantageous if it is inclined to displace gas bubbles from the first side. During the buildup of a further object layer, the structural element is to be positioned horizontally again.

A further aspect of the invention relates to an additive manufacturing device according to the preamble of claim 12, in which a temperature control unit for the setting temperature of the polymerizable liquid is arranged on the underside of the bottom. This device may also be combined with the features of dependent claims 2 to 4 and 6 to 11.

A further aspect of the invention relates to a method for the layered production of three-dimensional objects from a polymerizable liquid according to the preamble of claim 13. According to the invention, the trough is arranged below the structural element and the carrier platform is moved in the direction of the bottom of the trough during the layered construction of the object. This arrangement enables the object to be produced with high accuracy and dimensional accuracy, clean handling of the polymerizable liquid, and the use of many different functional materials to build up the object.

In one embodiment, to set the optimum process parameters of the polymerizable liquid, the liquid in the trough is homogenized and set to a process temperature and the construction space temperature is regulated. The construction space is to be understood as the space which is delimited by a housing and in which the components of the device are arranged, with the exception of the light source. The setting of the process parameters can be performed by a homogenizer, in particular a magnetic stirrer. The agitator of the magnetic stirrer can stir at the bottom of the trough, since the object is built up above the carrier platform thereon and is therefore not in the way. The temperature can also be set by a collar, which can be heated or cooled and encloses the trough. The use and selection of the polymerizable liquids is therefore not restricted to single-phase resins. Any multiphase functional materials comprising fillers or resins having high viscosities can also be processed.

It has proven to be particularly advantageous if, to change the polymerizable liquid, the trough is exchanged with a further trough having another polymerizable liquid. The trough or the container does not have to be emptied, cleaned, and filled with another liquid, but rather is simply closed and set to the side. The production change can therefore take place very rapidly and simply. For a large product portfolio, a variety of containers or troughs filled with polymerizable liquids can be stored. Of course, the size of the containers and the filling volumes can vary as needed.

In a further embodiment, a support, on which the carrier platform and the structural element are held, is retracted from the trough and extended into the further trough to change the trough for a further trough. A single translational movement of the support thus has the effect that the trough is removable from its holder without the further fittings having to be removed therefrom.

The invention is also distinguished in that the height of the trough in relation to the structural element is set during the object production such that the structural element is positioned outside the liquid level forming in the trough, on the liquid level, or in the liquid. Three production modes are therefore available for selection, as already stated above. The object layers can be built up outside or inside the polymerizable liquid due to the vertical mobility of the trough. This results in additional flexibility to be able to adapt the printing method optimally to the liquids to be used.

A partial vacuum or a protective gas atmosphere is advantageously built up on the first side of the structural element. Undesired gas bubbles on the structural element can thus be effectively displaced or detached. A clean structural element is thus always available during the production method.

BRIEF DESCRIPTION OF THE DRAWINGS

Further advantages and features result from the following description of an exemplary embodiment of the invention with reference to the schematic illustrations. In the figures, which are not to scale.

DETAILED DESCRIPTION OF THE INVENTION

Figure 1:
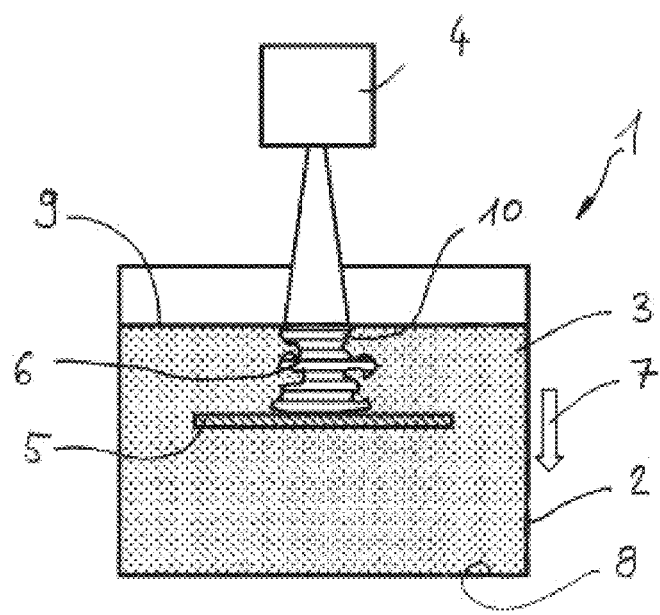
FIG. 1: shows a schematic illustration of the top-down printing method.
Figure 2:
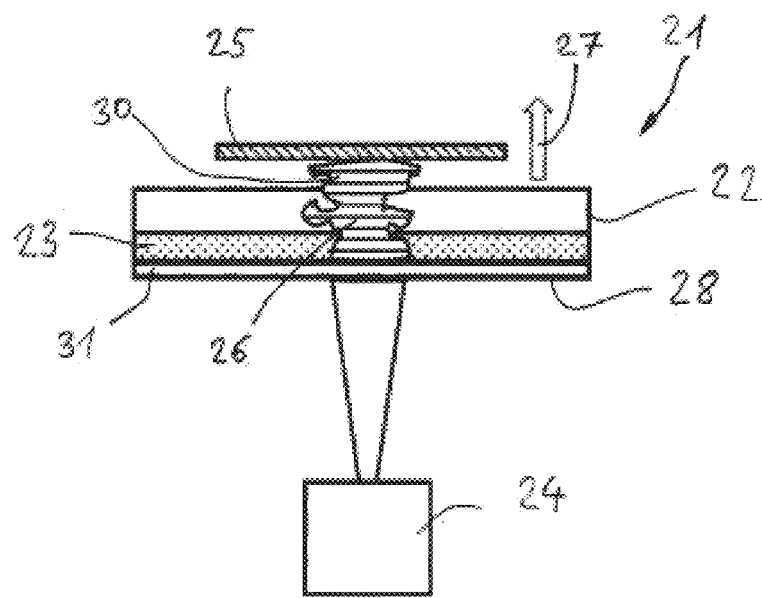
FIG. 2: shows a schematic illustration of the bottom-up printing method.

Two additive manufacturing devices for the layered production of three-dimensional objects, as are known from the prior art, are shown in FIGS. 1 and 2. The device according to FIG. 1 is identified with the reference sign 1, while in contrast the device according to FIG. 2 is identified with the reference sign 21.

The method shown in FIG. 1 is referred to as the top-down printing method. The device 1 for implementing this method comprises a trough 2, into which a polymerizable liquid 3 is dispensed. The liquid may be a resin, which is curable under UV radiation. An exposure source 4, which is at least one DLP projector, is provided as the radiation source. The three-dimensional object 6 is built up in a layered manner on a carrier platform 5, which is arranged inside the liquid 3. The carrier platform 5 is moved in the direction 7 of the bottom 8. In this case, the liquid 3 can flow in as a layer 10 between the object 6 and the surface 9 of the liquid. The flowing-in layer 10 cures under the influence of radiation according to the light area which is incident on the surface 9. The finished object 6 can be removed from the liquid 3. Since the layers 10 are cured on the surface 9, no defined buildup layer exists. The accuracy with which the object 6 is built up is thus subject to limits.

The method shown in FIG. 2 is referred to as the bottom-up printing method. The method is implemented using a device which is identified as a whole with the reference sign 21. The exposure source 24 radiates from below onto the bottom 28 of the trough 22. A structural element 31, on which the layers 30 of the object 26 are built up, is arranged on the bottom 28. The object 26 is built up in a layered manner between the structural element 31 and a carrier platform 25. If a layer 30 has been cured or polymerized, the carrier platform is thus displaced upward in the direction 27. Space is released between the structural element 31 and the object 26, into which the polymerizable liquid 23 can flow. The layer 30 cured on the structural element 31 has to be raised off of the structural element 31. The structural element 31 thus becomes worn out and is to be considered a wearing part, which has to be replaced at specific time intervals.

Figure 3:
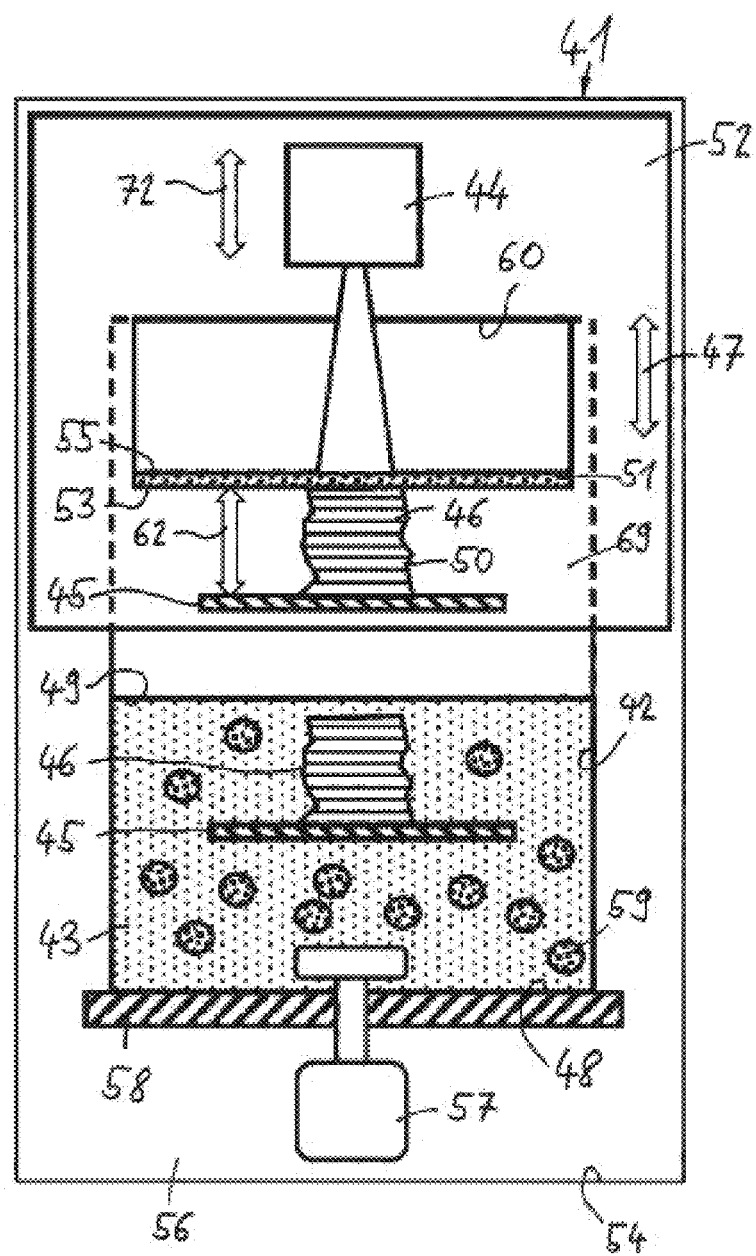
FIG. 3: shows a schematic illustration of the novel printing method.

The additive manufacturing device shown in FIG. 3 is identified as a whole with the reference sign 41. In principle, the device has similar components as the above-described prior art. However, the novel combination and arrangement of the components surprisingly results in a variety of advantages.

A polymerizable liquid 43 is dispensed into a trough 42 or the container 42. A carrier platform 45 is arranged so it is displaceable in the vertical direction in the trough 42. This is illustrated by the directional arrow 47. The object 46 is built up in a layered manner on the carrier platform 45. As shown in FIG. 3, the carrier platform 45 can also be moved out of the trough 42. In contrast to the prior art, the structural element 51 is arranged above the carrier platform 45 and not on the bottom 48 of the trough. The structural element 51 has a first and a second side 53, 55. The liquid 43 is polymerized on the first side 53 to form a layer 50 of the object. Light of a light source 44, which penetrates the structural element 51 and causes the curing of the liquid 43 directly on the first side 53, is incident on the second side 55. The light source 44 may be a DLP projector, because this is a cost-effective mass-produced product, which meets all requirements of the device 41. The elements of the device 41 may be arranged on a support 52 which is delimited by a housing 54, which will be described in greater detail in the next paragraph.

The carrier platform 45 and the structural element 51 may be held on a common support 52. The support 52 is schematically shown in FIG. 3 by a rectangle. The support 52 can be a framework constructed from profiles, for example, on which, in addition to the carrier platform 45 and the structural element 51, still further elements of the manufacturing device 41, for example, the DLP projector 44, can be arranged. The support 52 is displaceable together with the carrier platform 45 and the structural element 51 in relation to the trough 42 along the arrow 47. The support 52 is extendable into the trough 42 and is completely retractable therefrom. If the support 52 has been retracted from the trough 42, the trough 42 is thus free of fittings and can be rapidly exchanged with another trough having a second liquid. In order that the trough 42 is exchangeable with a further trough, the support 52 is therefore merely to be raised in the direction of the arrow 47 and/or retracted out of the trough 42. If the further trough is placed in the holder provided for this purpose, the device is thus ready for operation again very rapidly, as soon as the support 52 is extended into the further trough.

The carrier platform 45 is held displaceably on the support 52. The distance between the carrier platform 45 and the structural element 51 may thus be changed. The three-dimensional object 46 can be built up additively between the carrier platform 45 and the structural element 51, by the carrier platform 45 successively being displaced downward. This is illustrated by a first displacement arrow 62 in FIG. 3. After finishing of the object 46, the carrier platform 47 is displaced on the support 52 in the direction of the structural element 51, so that a further object can be additively built up in layers. Since the carrier platform 45 is arranged displaceably on the support 52, which is in turn displaceable, the trough 42 may be freed of all fittings by displacing the support 52.

The DLP projector 44 may also be arranged displaceably in the vertical direction on the support 52. This is illustrated by a second displacement arrow 72. The displaceability of the DLP projector 44 enables the resolution of the image projected onto the structural element 51 to be changed and set rapidly.

Since the bottom 48 is free of the structural element 51 and the structural element 51 is arranged separately from the trough 42 in the device, the space which has become free on the bottom 48 can be used for arranging a magnetic stirrer 57. Polymerizable liquids 43 which have to be homogenized can therefore also be processed in the device 41. Functional materials which contain fillers 59 can be used. Resins having high viscosities can also be used. The magnetic stirrer 57 comprises a plate 58, which can be heated or cooled and on which the trough 42 can be placed. A collar enclosing the trough 42, which can be cooled or heated, is conceivable for the temperature control of the process. In addition, the temperature of the construction room 56 can also be settable. By way of the possibility of setting the process temperature accurately to the polymerizable liquid 43 to be processed, a variety of liquids 43 may be completely homogenized and set to the optimum processing temperature. A holding housing 60 enclosing the second side 55 can be provided above the structural element 51, which is closed in relation to the construction room 56 and contains an adjustable optical unit for optimizing the buildup process.

Not only the carrier platform 45 but rather also the trough 42 are displaceable upward and downward along the arrow 47. The structural element 51 can thus be arranged during the printing of the object 46 above the liquid surface 49 or the liquid level. For the layer buildup, the object 46 wetted by liquid 43 can be raised out of the liquid with the aid of the carrier platform 45 and guided to the structural element 51 to cure a layer 50. For a further layer 50, the object has to be immersed into the liquid reservoir of the trough 42 again.

If it is necessary for the object printing, however, the structural element 51 can also be arranged on the surface 49 or in the liquid 43. The layer buildup then takes place in the liquid 43 and further liquid for the layer buildup can flow in directly from the trough 42.

A further advantage of the structural element 51 being separate from the trough 42 is that the trough 42 can be removed from the device 41 together with the liquid 43 and the stirrer and another trough or vessel having another liquid and a stirrer can be placed in the device 41. A product change may therefore be carried out in a short time. The provided trough 42 may be closable using a cover.

Figure 4:
FIGS. 4-6: show different embodiments of a structural element.

The structural element 51 can be constructed from a separating membrane 61 (FIG. 4). To be able to detach the printed layers 50 particularly carefully and easily from the separating membrane, the separating membrane 61 consists of an anti-adhesive material. For example, perfluoroethylene propylenes are particularly suitable. The material of the anti-adhesive separating membrane can be adapted depending on the liquid to be cured. Since the structural element 51 is separated from the trough 42, the structural element 51 may also be exchanged rapidly with another structural element. The structural element 51 can also comprise, in addition to the separating membrane 61, a carrier plate 63, for example, made of glass (FIG. 4). The static properties of the structural element 51 are thus improved. The separating membrane 61 is also simple to fasten or stretch on the carrier plate 63 or to exchange.

Figure 5:
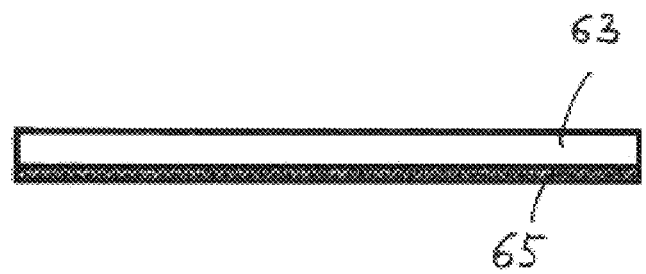
Figure 6:
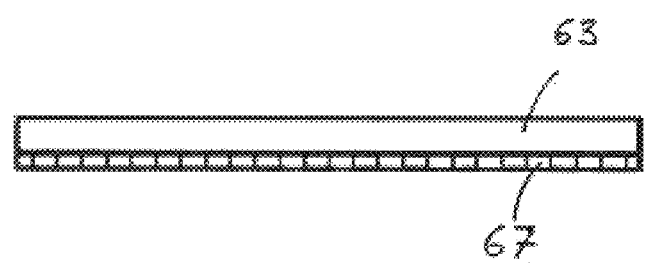

For good anti-adhesive properties, the carrier plate 63 can also be coated with a thin film 65 (FIG. 5). A thin film typically has a layer thickness of less than 10 μm. The structural element 51 can also be embodied as vibrating, to improve the detachment of the object layer 50 and detach adhering air bubbles. If the polymerizable liquid used makes it necessary for an inhibiting gas to be provided during the layer buildup, a permeable membrane 67 can thus be provided on the structural element 51 (FIG. 6).

To remove air bubbles adhering to the structural element 51 or to the uppermost layer of the object 46, the structural element 51 may be inclined in relation to the trough 42 when the object 46 is guided toward the structural element 51. To remove the undesired bubbles, the first side 53 of the structural element 51 may also be placed under partial vacuum or a protective gas can be applied thereto. The region in which a partial vacuum can be built up is shown by the dashed region 69, which can be referred to as a partial vacuum region. This region can be sealed in relation to the remaining volume inside the housing. The partial vacuum region may be sealed by extending the support 52 into the trough 42. Because the partial vacuum region 69 has a reduced volume in comparison to the volume of the housing 54, the partial vacuum is rapidly producible. The partial vacuum region may enclose the carrier platform 45 and the structural element 51 and in particular the first side 53 of the structural element 51. A partial vacuum or a protective gas atmosphere can thus be built up on the first side 53 of the structural element 51.

The invention claimed is:

1. An additive manufacturing device for the layered production of a three-dimensional object from a polymerizable liquid, comprising:
    a first trough filled with a first polymerizable liquid- and a second trough filled with a second polymerizable liquid, the first trough being exchangeable with the second trough,
    a carrier platform on which a three-dimensional object is built up and which is vertically displaceable in relation to the trough,
    a radiation-transmissive structural element having a first and a second side, on which the first liquid polymerizes on the first side to form an object layer, and
    a radiation source which irradiates the second side of the radiation-transmissive structural element, wherein the radiation-transmissive structural element is arranged above the carrier platform, the carrier platform and the radiation-transmissive structural element are held on a common support, which support is extendable into and retractable from the first or second trough that is in use to allow for the first trough to be exchanged with the second trough, whereby extension and retraction of the common support moves the carrier platform, radiation-transmissive structural element and any three-dimensional object being built therewith and whereby a distance between the radiation-transmissive structural element and the carrier platform is changeable in relation to one another to accommodate buildup of the three-dimensional object therein between.

2. The device as claimed in claim 1, wherein the carrier platform is displaceable at least in a vertical direction on the support to change the distance between the carrier platform and the structural element.

3. The device as claimed in claim 2, wherein the radiation source is displaceable at least in the vertical direction on the support.

4. The device as claimed in claim 1, further comprising a temperature-controllable homogenization unit positioned proximate a bottom of at least one of the first and second troughs for homogenizing and setting the temperature of the first or second polymerizable liquid.

5. The device as claimed in claim 4, wherein the homogenization unit is a magnetic stirrer.

6. The device of claim 1, wherein the radiation-transmissive structural element comprises a separating membrane.

7. The device as claimed in claim 6, wherein the separating membrane consists of perfluoroethylene propylene (FEP).

8. The device as claimed in claim 6, wherein the separating membrane is gas-permeable.

9. The device as claimed in claim 1, wherein the radiation-transmissive structural element comprises a carrier plate.

10. The device as claimed in claim 9, wherein the carrier plate has a thin-film coating.

11. A method for the layered production of a three-dimensional object from polymerizable liquids, comprising:
polymerizing and curing a first polymerizable liquid in object layers between a carrier platform and a radiation-transmissive structural element having a first and a second side,
moving the carrier platform away from the radiation-transmissive structural element to increase a distance between the carrier platform and the radiation-transmissive structure during an object buildup,
providing the first polymerizable liquid in a first trough,
irradiating the radiation-transmissive structural element on the second side facing away from the carrier platform using a radiation source in order to polymerize the first polymerizable liquid into object layers,
moving the carrier platform toward a bottom of the first trough positioned below the structural element during buildup of the object layers of the three-dimensional object, and
retracting a support on which the carrier platform and the radiation-transmissive structural element are held and the three-dimensional object being built up from the trough and extending the support into a second trough to exchange the first trough with the second trough, the second trough containing a second polymerizable liquid different from the first polymerizable liquid to change the first polymerizable liquid with the second polymerizable liquid, whereby extracting the support moves the carrier platform, radiation-transmissive structural element and the three-dimensional object being built therewith.

12. The method as claimed in claim 11, further comprising homogenizing the first polymerizable liquid in the first trough, setting the first polymerizable liquid to a process temperature and regulating a construction room temperature to set optimum process parameters of the first polymerizable liquid.

13. The method as claimed in claim 11, further comprising setting a height of the first trough in relation to the structural element during object production such that the radiation-transmissive structural element is positioned below a liquid level of the first polymerizable liquid in the first trough or at the liquid level of the first polymerizable liquid in the first trough.

14. The method as claimed in claim 11, further comprising forming a partial vacuum or a protective gas atmosphere on the first side of the radiation-transmissive structural element.

* * * * *